US006356855B1

(12) United States Patent
Yamagata et al.

(10) Patent No.: US 6,356,855 B1
(45) Date of Patent: Mar. 12, 2002

(54) MOVING BODY DETECTION SYSTEM

(75) Inventors: Tetsuo Yamagata; Hajime Tabata, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/330,152

(22) Filed: Jun. 11, 1999

(30) Foreign Application Priority Data

Jun. 12, 1998 (JP) .......................................... 10-164711

(51) Int. Cl.[7] ............................................... G01C 17/00

(52) U.S. Cl. ....................... 702/150; 340/903; 340/933; 340/935; 342/357.7; 342/357.8; 702/151; 702/152; 702/153

(58) Field of Search ................................ 702/150, 151, 702/152, 153; 340/903, 933, 935; 342/357.07, 357.08

(56) References Cited

U.S. PATENT DOCUMENTS 3,949,397 A * 4/1976 Wagner et al. ........... 343/6.5 R
5,003,317 A * 3/1991 Gray et al. ................. 342/457
5,446,462 A * 8/1995 Cleveland .................... 342/45
5,532,702 A 7/1996 Mintz ......................... 342/463
5,581,249 A * 12/1996 Yoshida ...................... 340/928
5,710,556 A * 1/1998 Nishimura et al. ......... 340/928
5,952,940 A * 9/1999 Matsumono ................. 340/905
6,201,495 B1 * 3/2001 Lemelson et al. ............ 342/45
6,252,396 B1 * 6/2001 Arndt et al. ........... 324/207.17

FOREIGN PATENT DOCUMENTS

DE 19636632 A1 3/1998
EP 0715286 A1 6/1996
JP A2-216600 8/1990
JP A7-225274 8/1995
WO WO9604632 2/1996

OTHER PUBLICATIONS

Thomas Williamson et al., "Development and Operation of the Traffic Alert and Collision Avoidance System (TCAS)", vol. 77 No. 11, Nov. 1, 1989, pp. 1735–1744.

* cited by examiner

*Primary Examiner*—Arthur T. Grimley

(57) ABSTRACT

To provide a moving body detection system capable of reliably receiving response signals and discerning the arrangement of opposing moving bodies. A moving body detection system for transmitting and receiving signals in such a manner that moving bodies can detect each other, wherein each moving body transmits an ID code for identifying the moving body itself and giving a priority to the moving body as an ID code signal of a fixed time period, each moving body receives said ID code signals of other moving bodies, each moving body receiving an ID code signal makes a determination as to whether or not a neighboring upper order moving body of a higher order than itself is present within a prescribed distance and each moving body determining the presence of a neighboring upper order moving body receives a detection signal transmitted from a detection side moving body and transmits a response signal only when the neighboring upper order moving body is determined not to be present.

10 Claims, 8 Drawing Sheets

MOVING BODY DETECTION SYSTEM

BACKGROUND OF THE INVENTION

1. Field of the Invention

The present invention relates to a moving body detection system for detecting moving bodies by exchanging signals between moving bodies such as vehicles and pedestrians, etc.

2. Description of the Background Art

Various methods have been put forward in the related art for detecting other approaching vehicles and other moving bodies while driving.

For example, in Japanese Patent Laid-open Publication No. Hei 2 (1990)-216600, a receiving device provided in a vehicle carries out monitoring as the vehicle progresses. An alarm is generated and the presence of a moving body is made known as a result of the receiving device receiving an alarm signal transmitted by a transmission device provided on another moving body.

However, as the number of moving bodies that cause the alarm is not known, when only one vehicle is confirmed by sight it is difficult to be aware of the presence of other vehicles.

Therefore, as disclosed in Japanese Patent Laid-open Publication No. Hei 7(1995)-225274, confirmation is displayed as a result of discerning whether or not one or a plurality of moving bodies exist within a prescribed distance by comparing intervals in the increases of consecutive pulses occurring in a receive signal with a reference period.

However, only whether one or a plurality of opposing moving bodies is present is known and it is not possible to be aware of configurations such as an arrangement when a plurality of moving bodies are present.

Namely, for example, when a plurality of groups configured of a number of cars in close proximity are travelling, it cannot be discerned whether there is one large group or a number of small groups.

It is therefore important for the driver of the vehicle to understand not just information that one or a plurality of moving bodies exist but also to understand how such moving bodies are arranged.

Further, when there is a multiplicity of opposing moving bodies, transmitted signals become mixed up and it is not possible to receive signals in a reliable manner due to mixed lines etc.

SUMMARY AND OBJECTS OF THE INVENTION

As it is the object of the present invention to resolve the aforementioned problems, the present invention sets out to provide a moving body detection system capable of receiving response signals in a reliable manner and discerning the configuration of the arrangement of opposing moving bodies.

In order to achieve the aforementioned object, in, the present invention there is provided a moving body detection system for transmitting and receiving signals in such a manner that moving bodies can detect each other. Each moving body transmits an ID code for identifying the moving body itself and giving a priority to the moving body as an ID code signal of a fixed time period. Each moving body receives the ID code signals of other moving bodies. Each moving body receiving an ID code signal makes a determination as to whether or not a neighboring upper order moving body of a higher order than itself is present within a prescribed distance. Each moving body determining the presence of a neighboring upper order moving body receives a detection signal transmitted from a detection side moving body and transmits a response signal only when the neighboring upper order moving body is determined not to be present.

As a response signal is then transmitted with respect to a detection signal only when it is discerned that there is no neighboring upper order moving body of an ID code of a higher order priority than a moving body itself within a prescribed distance of the moving body itself, the moving body of the highest order ID code within a group of moving bodies within a prescribed distance transmits a response signal representative of the group.

As a moving body representative of each group transmits a response signal, the detection side moving body receiving this signal can be aware of the main parts of the configuration of the opposing moving bodies that are deemed necessary.

Only a moving body typical of the group transmits a response signal and other moving bodies do not transmit response signals. The response signals therefore do not become mixed up and can be received in a reliable manner.

In a second aspect of this invention, there is provided a moving body detection system for transmitting and receiving signals in such a manner that moving bodies can detect each other, wherein each moving body can identify a type to which it itself belongs and transmits an ID code for identifying itself and giving itself a priority with respect to each type as an ID code of a fixed period, each moving body receives ID code signals from other moving bodies, a moving body receiving an ID code makes a determination as to whether or not a neighboring upper order moving body belonging to the same type, and of an ID code of a higher order priority than itself is present or not within a prescribed distance. A moving body determining the presence of a same type of neighboring upper order moving body transmits a response signal only when a same type neighboring upper order moving body is determined not to be present when a detection signal transmitted from a detection side moving body is received.

A response signal is transmitted with respect to a detection signal only when it is determined that a same type neighboring upper order moving body of an ID code of a higher order priority than the moving body and belonging to the same type does not exist within a prescribed distance. A response signal typical of the same type of moving body is therefore transmitted by the moving body of the highest order ID code for each type within a group of moving bodies within a prescribed distance.

Moving bodies are classified into large vehicles, small vehicles, motorcycles, bicycles and pedestrians etc., and when each type of moving body is present as a moving body constituting a group, a response signal is generated by a moving body that is representative of each group. The receiving side moving body that then receives this signal can then be aware of the configuration of the group of opposing moving bodies and the main aspects of the configuration of moving bodies within a group.

As just a moving body representative of the moving bodies of the same type transmits a response signal and other moving bodies do not, the response signals do not become mixed up and can be reliably received.

In a third aspect of this invention, there is provided a moving body detection system for transmitting and receiving signals in such a manner that moving bodies can detect each other, wherein a second moving body receiving a detection signal transmitted by a first moving body transmits a response signal with respect to the detection signal except in the case where a response signal transmitted previously by a third moving body within a prescribed distance from the second moving body is received by the second moving body.

The second moving body transmits a response signal with respect to the detection signal except when a response signal has been received previously from a third moving body within a prescribed distance. Other moving bodies therefore do not transmit a response signal with respect to the detection signal when a response signal is received previously from within a group of moving bodies within a prescribed distance.

Namely, a moving body that has transmitted a response signal previously with respect to a detection signal generates a response signal as a moving body that is representative of each group. The main aspects of the configuration of the opposing moving bodies can therefore be known at the first moving body on the detection side that receives the response signal.

The response signals can therefore be received in a reliable manner without becoming mixed up because a response signal is only transmitted by a moving body that is representative of a group and not by other moving bodies.

In a fourth aspect of this invention, a type code identifying the type of a moving body is included in the response signal, and the second moving body transmits a response signal with respect to the detection signal with the exception of the case where a response signal from the second moving body has already been received from the third moving body belonging to the same type as the second moving body.

The second moving body generates a response signal with respect to the detection signal except when a response signal transmitted by the third moving body within a prescribed distance and belonging to the same type is received previously. Other moving bodies of the same type therefore do not transmit response signals with respect to the detection signal when a response signal is transmitted beforehand from a moving body of the same type within a group of moving bodies with the prescribed distance.

When each type of moving body exists as moving bodies constituting a group, a response signal is generated by a representative moving body that has generated a response signal beforehand for each type. The configuration of a group of opposing moving bodies and the configuration of the main parts of moving bodies within a group can therefore be known at the first moving body on the detection side that receives this response signal.

As just a moving body representative of the moving bodies of the same type transmits a response signal and other moving bodies do not, the response signals do not become mixed up and can be reliably received.

In a fifth aspect of this invention, a moving body receiving the detection signal measures the distance to the moving body transmitting the response signal based on the received response signal.

The main aspects of the arrangement of the non-detection side moving bodies can be known at the detection side moving body by measuring the distance to the moving body that generated the response signal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
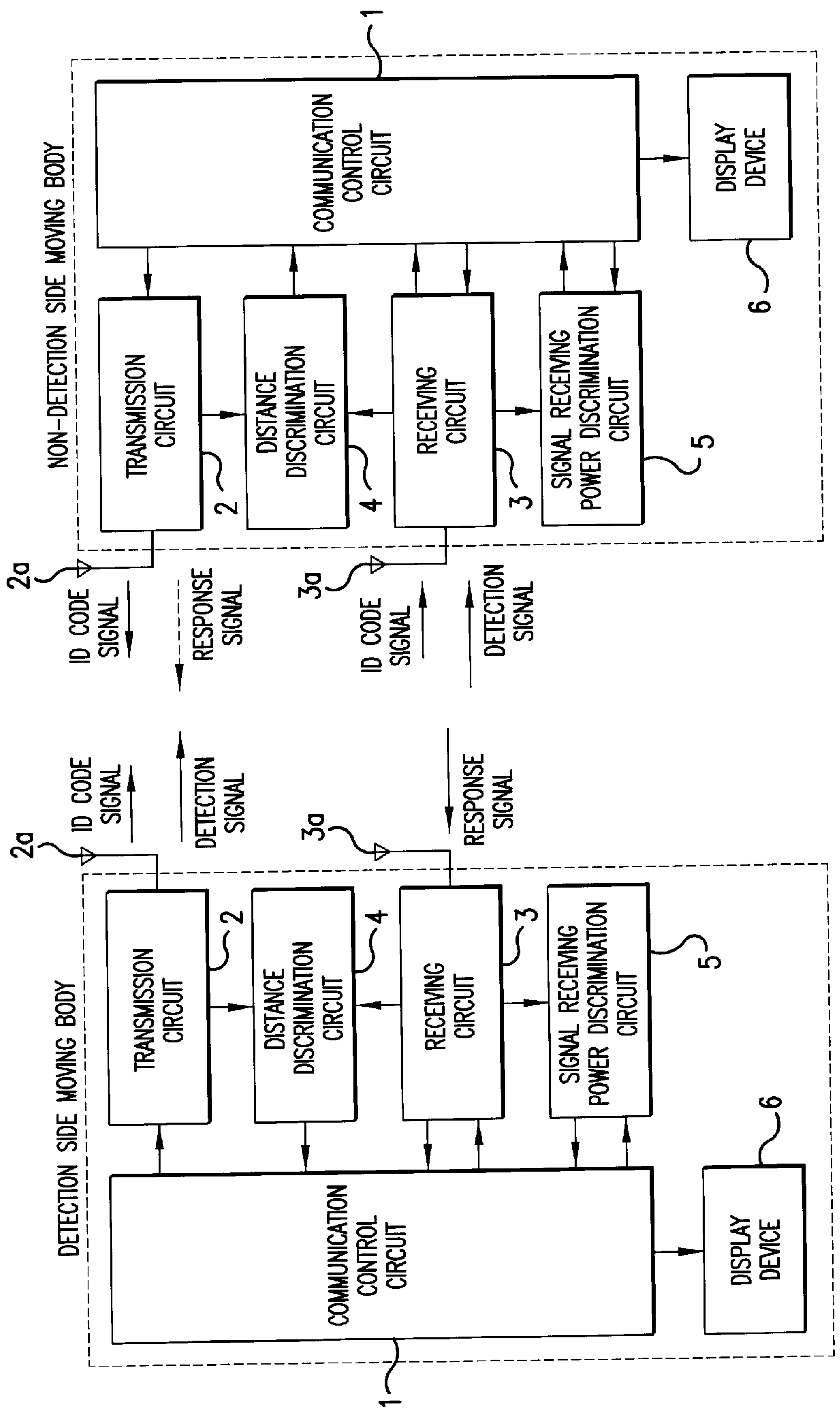
FIG. 1 is a simplified block view of a moving body detection system relating to a first embodiment of the present invention.

The following is a description of a first embodiment of the present invention shown in FIG. 1 to FIG. 7. A simplified block diagram of a moving body detection system of this embodiment is shown in FIG. 1. All of the moving bodies are equipped with the same communication control device.

A communication control circuit 1 provides a transmission instruction to a transmission circuit 2 and takes as input a signal received by a receiving circuit 3. A distance discrimination signal from a distance discrimination circuit 4 and a signal receiving power discrimination signal from a signal receiving power discrimination circuit 5 are also inputted to the communication control circuit 1. The results of signal processing are outputted to a display device 6 as a display signal.

The transmission circuit 2 transmits an ID code signal, receives a transmission instruction from the communication control circuit 1 and generates a detection signal having a prescribed directivity from a transmission antenna 2*a*.

The receiving circuit 3 receives the ID code signal, receives a response signal at a receiving antenna 3*a* and outputs this response signal to the communication control circuit 1.

A signal at the time of generation of the detection signal from the transmission circuit 2 and a signal for the time of receival of the response signal from the receiving circuit 3 are inputted to the distance discrimination circuit 4. The distance discrimination circuit 4 then determines the distance between the detection side moving body and the non-detection side moving body from the time difference of both the signals and outputs a distance determination signal for these determination results to the communication control circuit 1.

The signal receiving power discrimination circuit 5 determines whether or not the receiving power of the ID code signal received by the receiving circuit 3 is larger than a prescribed threshold value and outputs a signal receiving power determination signal for these determination results to the communication control circuit 1.

A display device 6 comprises a liquid crystal display which notifies the driver of the construction of the non-detection side moving body when there is a response signal using a character display.

The driver can be notified by the lighting of a display lamp. This notification is by no means limited to a visual display, with an audio indication also being possible.

The ID code signal is capable of identifying its own moving body from another and is a fixed output pulse signal of a fixed period T with an ID code giving its priority attached. The period T of the ID code signal is sufficiently large with respect to the time width of the ID code portion.

If moving bodies gather together, an order of priority is decided using the priorities of the ID codes.

The ID code signal is transmitted with a fixed, extremely low output, with a communication area being limited to nearby and with low energy consumption.

The detection signal and response signal are of a high output and broad communication area compared with this ID code signal.

As shown in FIG. 1, all of the ID code signals for the moving body are transmitted in the neighboring area and approaching like moving bodies reciprocally receive ID code signals.

The detection side moving body then transmits a detection signal for the driving conditions or the intent of the driver and receives a response signal, if present.

At the non-detection side moving body, like approaching moving bodies exchange ID code signals, receive detection signals if present and generate a response signal under fixed conditions.

Figure 2:
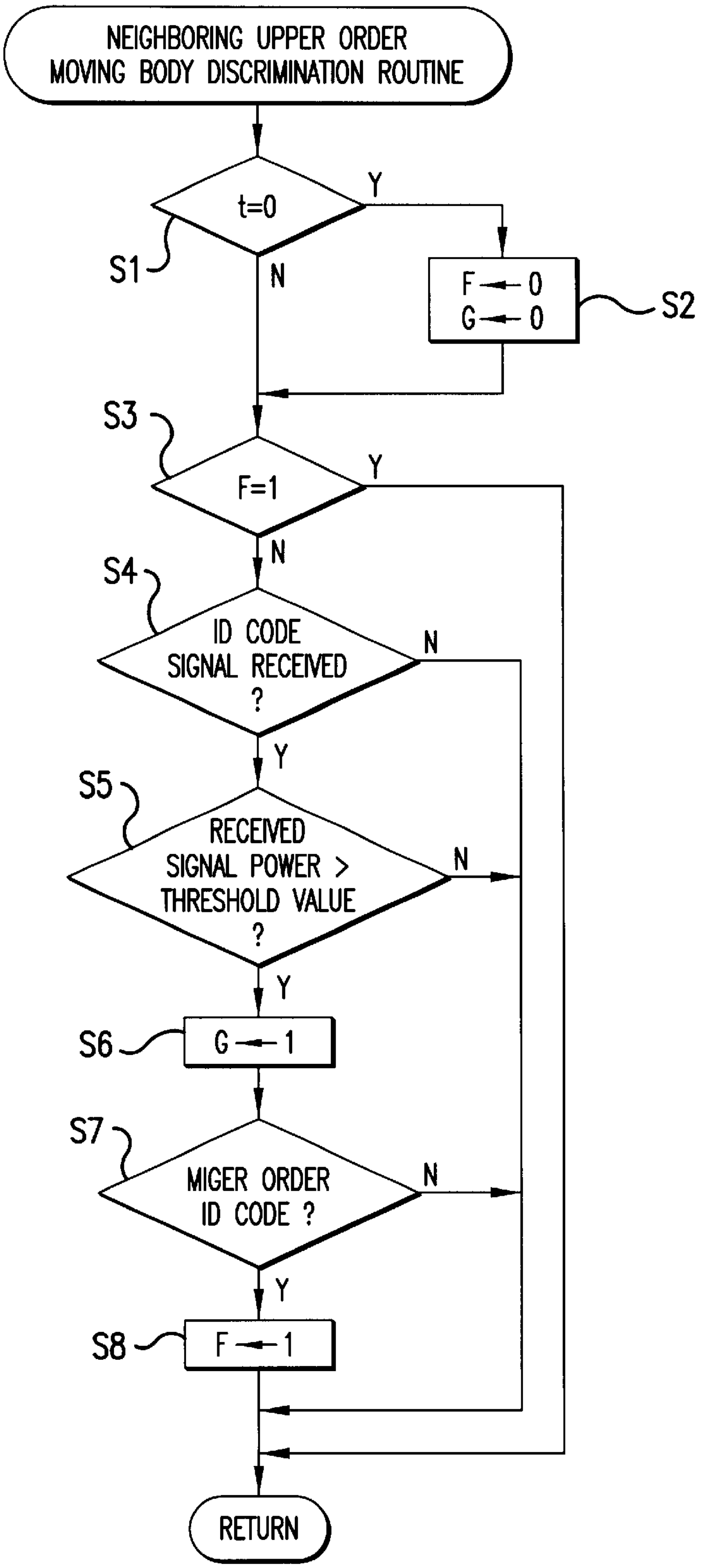
FIG. 2 is a flowchart showing a nearby upper order moving body discrimination routine for communication control at a non-detection side moving body.
Figure 3:
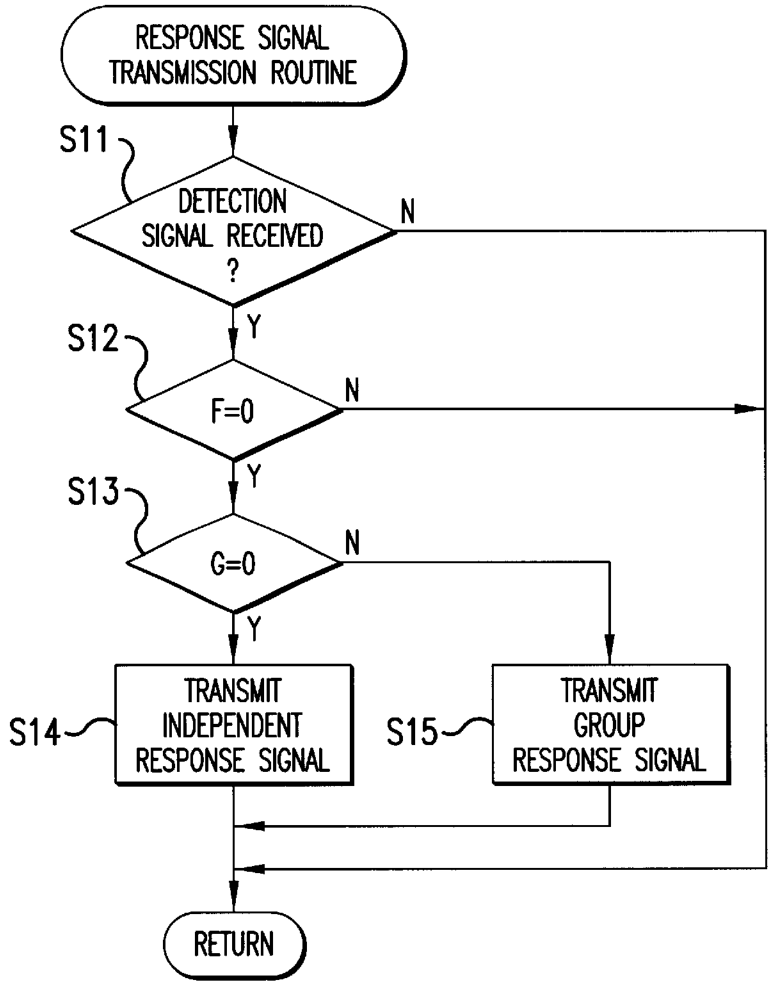
FIG. 3 is a flowchart showing a same response signal transmission routine.

Communication control occurring at the non-detection side moving body is described using the flowcharts in FIG. 2 and FIG. 3.

FIG. 2 is a routine for a detection side moving body to determine whether or not a moving body with an ID code or a higher ranking priority than its own is close to the non-detection side moving body, with steps of the same routine being repeated and punctuated by fixed time periods so as to carry out a determination process.

First, whether or not the same routing is entered is determined in a time t (step 1), with step 2 being proceeded to at a start time of t=0. Flag F and flag G are both then set to "0" and from thereafter step 3 is proceeded to directly from step 1 until a fixed time period is exceeded.

As the step of determining whether of not F=1 of step 2 is entered initially with F=0, step 4 is proceeded to from step 3 and a determination is made as to whether or not an ID code signal is received.

If no signal is received, this routine is exited with F=0 left as is and repeating is carried out from step 1.

If a signal is received, step 5 is proceeded to and a determination is made as to whether or not the receiving power of the ID code signal is larger than a prescribed threshold value.

As the signal receiving power attenuates with distance, a receiving power of greater than the threshold value indicates that the moving body transmitting the signal is in a close position with a prescribed distance. When the signal receiving power is smaller than the threshold value so that the moving body is at a distance greater than the prescribed distance, this routine is exited with F=0 left as is and repeating is carried out from step 1.

When a moving body is within the prescribed distance, step 6 is proceeded to, a flag "G" for indicating the presence of a moving body within the prescribed distance is set to "1" and step 7 is proceeded to.

In step 7, a determination is made as to whether or not the ID code of the received ID code signal is of a higher order priority than its own ID code.

If the ID code is not of a higher order, this routine is exited with F=0 remaining as is and repeating is carried out from step 1.

If the ID code is of a higher order, step 8 is proceeded to, a flag "F" is set to "1" and this routine is exited.

Once the flag "F" is set to "1", from then on this routine is usually exited using the determination as to whether F=1 in step 3.

Namely, when another moving body is within a prescribed distance of the non-detection side moving body, the non-detection side moving body sets the flag G to "1" and when a moving body with an ID code of a higher order is present, the flag F is set to "1". When there is no higher order moving body present nearby, the flag F is left as "0".

In the flowchart of a response transmission routine of FIG. 3, first a determination is made as to whether or not a detection signal has been received (step 11). If received, this routine is exited, step 11 is repeated and the receipt of a detection signal is waited for.

When a detection signal is received, step 12 is proceeded to, a determination is made as to whether or not the flag F is "0" and if F=1, this routine is exited and a response signal is not generated. If F=0, step 13 is proceeded to and a determination is made as to whether or not flag G is "0". If G=0, step 14 is proceeded to and an independent response signal is generated. If G=1, step 15 is proceeded to, a group response signal is generated and this routine is exited.

An independent response signal is a response signal with a signal indicating the absence of another moving body within a prescribed distance of the surroundings of the moving body itself added. A group response signal is a response signal with a signal indicating the presence of another moving body within a prescribed distance of the moving body itself added.

Namely, when a higher order moving body is nearby (F=1), the non-detection side moving body does not generate a response signal itself even if a detection signal is received. When a higher order moving body is not nearby (F=0), when a detection signal is received, if this detection signal is not of a group configuration an independent response signal is generated and if this detection signal is of a group configuration, a group response signal is generated.

The group of non-detection side moving bodies respectively progressing within the prescribed distance transmits a group response signal representative of the moving body with the ID code of the highest order.

A group response signal is transmitted from single moving bodies typical of each group.

An independent response signal is transmitted from moving bodies not constituting this group.

When a response signal for the detection signal is present at the detection side moving body, a distance is determined by the distance discrimination circuit 4 and when a plurality of response signals are present, respective distances are determined.

As one or a plurality of opposing moving bodies are represented by one response signal, the approximate size of the distances can be detected and if a plurality of response signals are present, the arrangement configuration can be known and the driver can be notified of this configuration using character information at the display device 6. A specific example is shown in FIG. 4 to FIG. 7.

Figure 4:
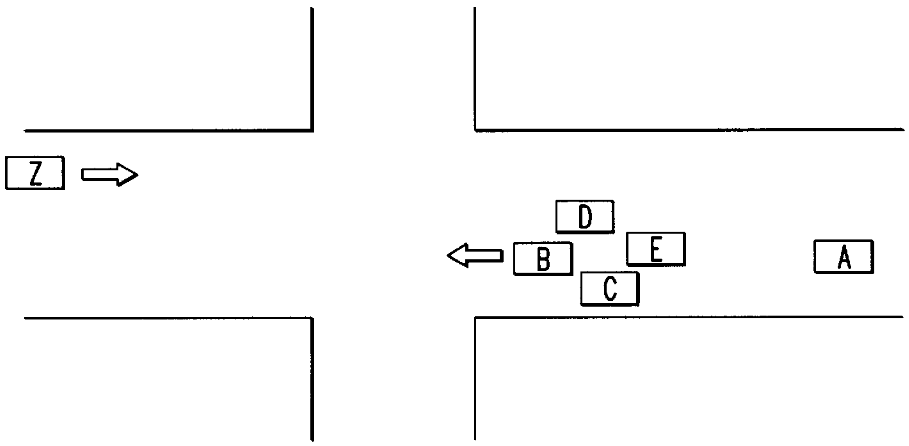
FIG. 4 is a simplified plan view showing the travel situation of a plurality of vehicles.

FIG. 4 is a simplified plan view showing the progress of a plurality of vehicles. A detection vehicle Z is proceeding from the left in the direction of a crossroads and is intending to turn right at the crossroads.

In the opposite lane, five vehicles A, B, C, D and E constituting non-detection side vehicles are proceeding towards the crossroads.

Of the five vehicles A, B, C, D and E, the leading four vehicles B, C, D and E constitute a neighboring group.

Figure 5:
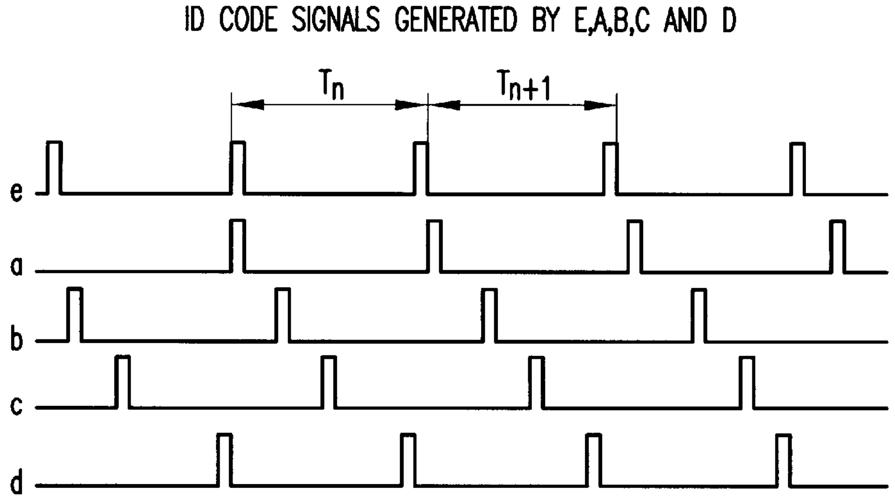
FIG. 5 is a view showing ID code signals transmitted by vehicles A, B, C, D and E.

The five vehicles A, B, C, D and E transmit ID code signals a, b, c, d and e, respectively, as shown in FIG. 5.

Each of the ID code signals a, b, c, d and e are output with the same period T but are not in synchronism with each other.

Figure 6:
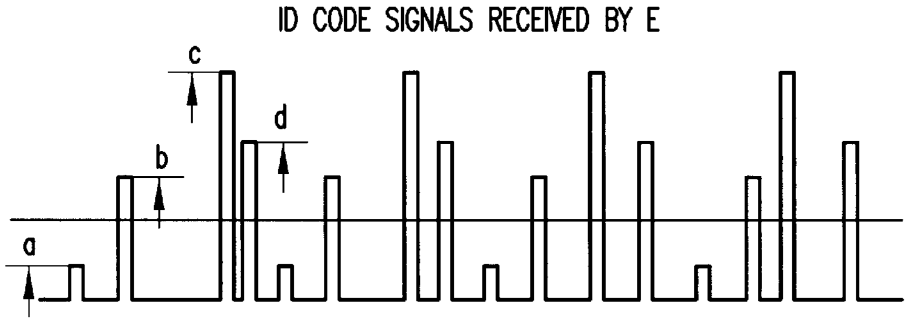
FIG. 6 is a view showing ID code signals received by vehicle E.

An ID code giving an order is listed in the ID code signal with an order, from the upper order, of a, b, c, d, e being given between the vehicles A, B, C, D and E. Taking note of vehicle E, the ID code signals a, b, c and d received by the receiving circuit 3 of the vehicle E from the other vehicles A, B, C and D are shown in FIG. 6.

The signal receiving power of each of the ID code signals a, b, c and d is attenuated more the further away the transmission occurs. The signal receiving power is therefore highest for the ID code signal c from the vehicle C which is the closest to the vehicle E, with the ID code signals d and b being next and the vehicle A which is the furthest away from the group having the lowest ID code signal a.

The signal receiving power discrimination circuit 5 of the vehicle E then compares the signal receiving power of the ID code signals a, b, c and d taking a prescribed threshold value as a reference and can recognize that the ID code signals b, c and d that are larger than the threshold value are signals for vehicles B, C and D that are adjacent and within a prescribed distance from the vehicle E and that the vehicles B, C, D and E constitute one group.

The ID code signals b, c and d are all of a higher ranking order than that of the ID code signal e of the vehicle E. The vehicle E therefore puts the flag F to “1” using the ID code signal of the vehicle B received first from the neighboring upper order vehicles B, C and D and then does not transmit a response signal even if a detection signal is received.

Similarly, regarding the vehicle A which is detached from the group, as the other vehicles B, C, D and E are not within a prescribed distance from the vehicle A, the signal receiving powers are all less than the threshold value, the flag G and the flag F are both “0” and if the vehicle A receives a detection signal, the vehicle A transmits an independent response signal.

The vehicle B is within the group and has the flag G set to “1” and has the ID code of the highest order priority within the group, with the vehicles C, D and E being of a lower order. The flag “F” is therefore “0” and the vehicle B transmits a group response signal if a detection signal is received.

The vehicles C and D are both determined to be higher order vehicles in the proximity of the vehicle B. The flag F is therefore set to “1” and a response signal is transmitted.

Figure 7:
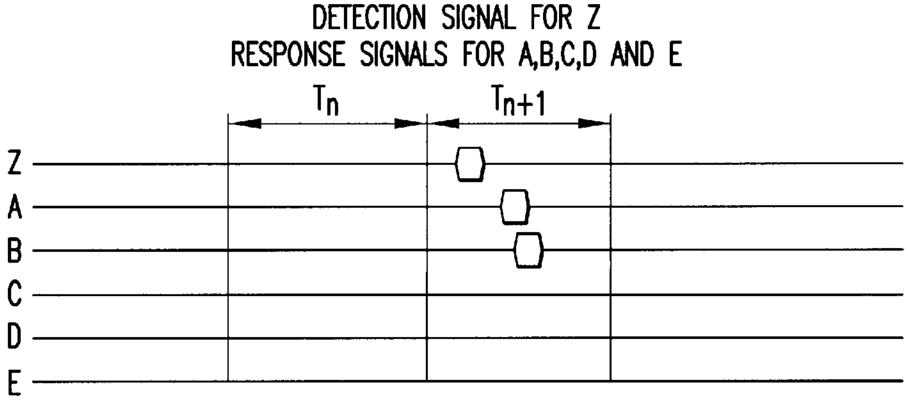
FIG. 7 is a view showing a detection signal of vehicle Z and response signals of vehicles A, B, C, D and E.

If the vehicle Z is to turn left in the situation shown in FIG. 4 so that a detection signal in order to cause a right indicator switch to operate is transmitted, as shown in FIG. 7, there is an independent response signal from the vehicle A and a group response signal from the vehicle B but there is no response signal from the vehicles C, D and E.

As the vehicle A is independent from the group, an independent response signal is transmitted and the vehicle B transmits a group response signal representative of the group with the highest order ID code within the group.

The detection side vehicle Z then receives the independent response signal from the vehicle A and the group response signal from the vehicle B and calculates the respective distances for display at the display device 6.

The driver of the vehicle Z can therefore be aware of the distance to and the presence of the vehicle A travelling independently to the rear of the opposite lane and the vehicle B configuring the group. The driver can also know the configuration of the group that vehicle B constitutes and can recognize the principal aspects of the configuration of the opposing vehicles.

Just the moving body B which is typical within the group transmits a group response signal and the other moving bodies C, D and E do not transmit responses and receiving signals can therefore be carried out in a reliable manner without mixing up the response signals.

Next, a description is given of a further embodiment based on FIG. 8 to FIG. 11.

Figure 10:
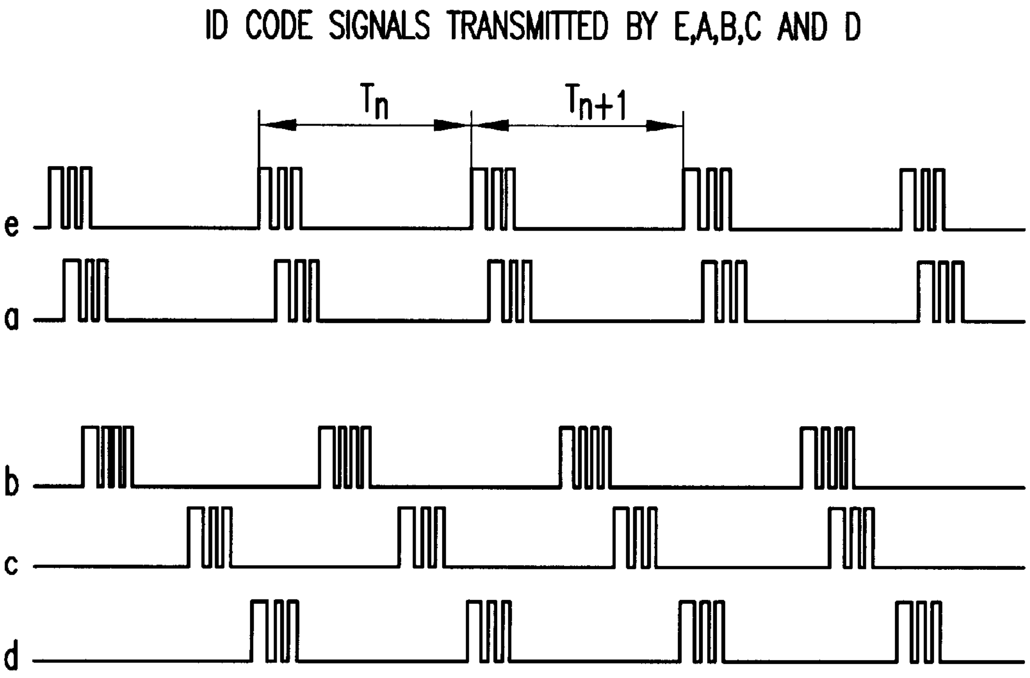
FIG. 10 is a view showing ID code signals generated by vehicles A, B, C, D and E of the same embodiment.

The moving body detection system is the same as that shown in FIG. 1 with moving bodies being classified into large vehicles, small vehicles, motorcycles, bicycles and pedestrians etc., with a self-classification code identifying this type being placed on the ID code signal for each moving body (FIG. 10).

The ID code with the priority for this ID code signal gives the priority of items within items classified as the same type.

Figure 8:
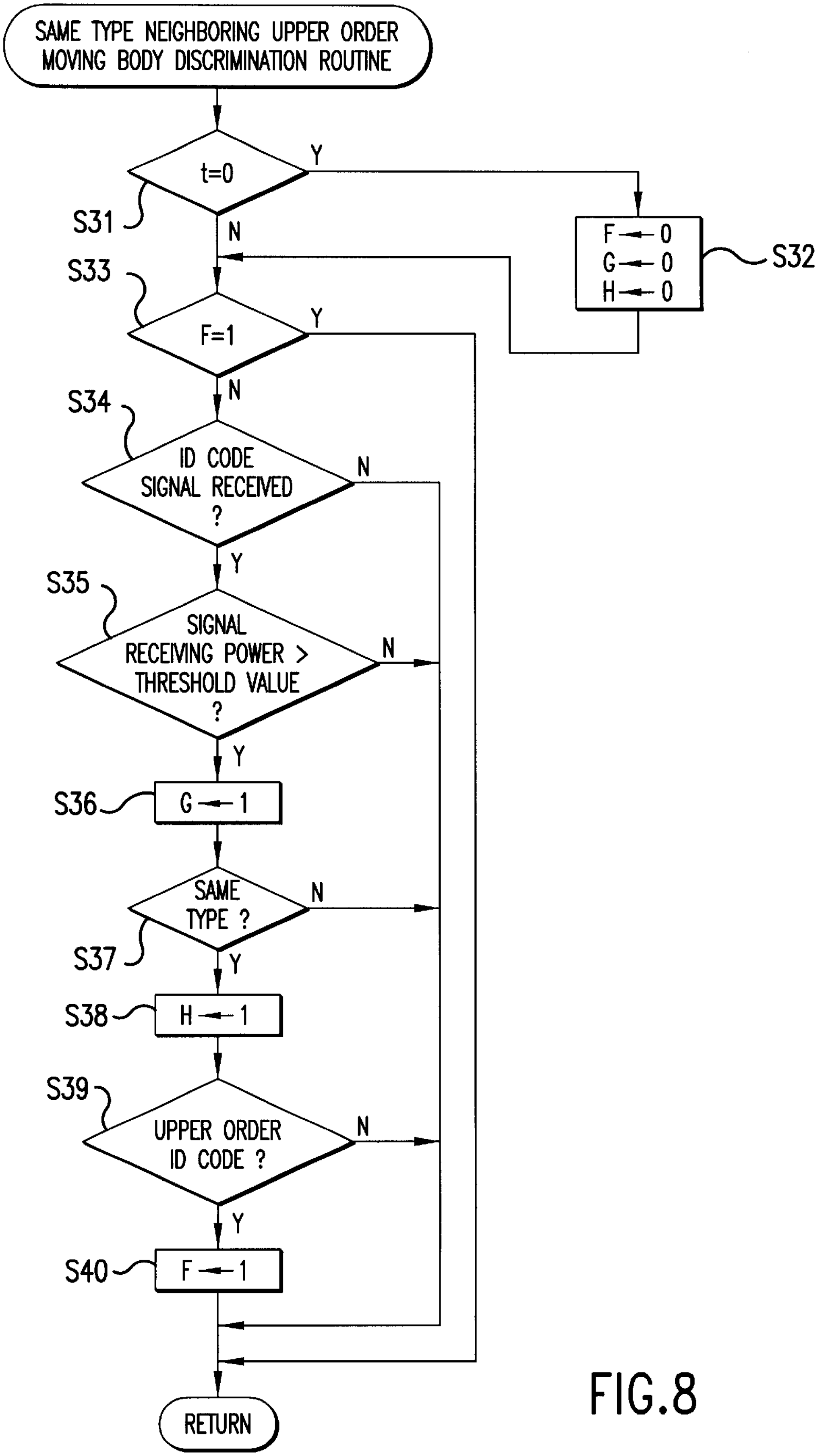
FIG. 8 is a flowchart showing a same type neighboring upper order moving body discrimination routine for communication control in a further embodiment.
Figure 9:
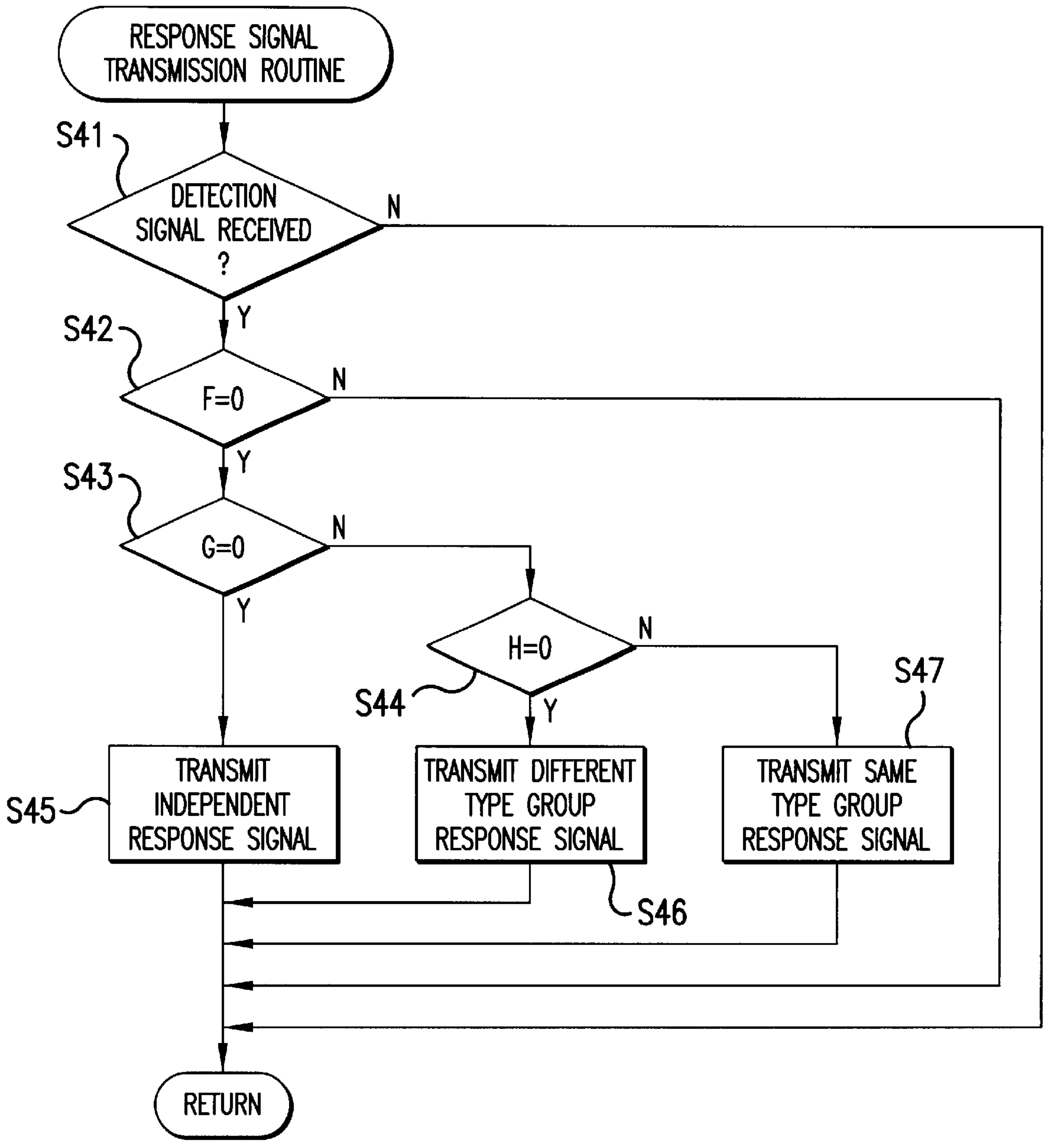
FIG. 9 is a flowchart showing a same response signal transmission routine.

A same type neighboring upper order moving body determination control procedure occurring at the non-detection side moving body is shown in FIG. 8 and a response signal transmission routine is shown in FIG. 9.

In the same type neighboring upper order moving body determination routine of FIG. 8, the initial (step 31) flags F, G and H for time t=0 are all taken to be “0” (Step 32). Step 34 is proceeded to from step 33 and the receipt of an ID code signal is waited for. When a signal is received, it is determined whether or not the signal receiving power is greater than the threshold value (step 35). When the signal receiving power is greater than the threshold value, i.e. when a neighboring moving body is present, step 36 is proceeded to and the flag G is set to “1”. It is then determined whether or not the vehicle type is the same from the classification code (step 37). If the type is the same, step 38 is proceeded to and the flag H is set to “1”. If a moving body is of a higher priority within ID code classifications of the same type, i.e. if the same type of neighboring upper order moving body is discerned, the flag F is set to “1” (step 40).

If the same kind of neighboring upper order moving body is not present, the flag F is “0” and if the same kind of neighboring upper order moving body is not present the flag G is “0”.

In the response signal transmission routine of FIG. 9, first, when the detection signal is received (step 41), a determination is made in step 42 as to whether or not the flag F=0. If the same type of neighboring moving body exists and F=1, this routine is exited and a response signal is not generated and if F=0, step 43 is proceeded to the a determination is made as to whether or not the flag G=0.

If neighboring moving bodies do not exist and G=0, step 45 is proceeded to and an independent response signal is generated. When a group is constituted, G=1, step 44 is proceeded to and whether or not flag H=0 is determined. When the same type of moving bodies do not exist within a group, H=0, step 46 is proceeded to and a different type group response signal is transmitted. When the same type of moving body exists within a group, step 47 is proceeded to with H=1 and a same type group response signal is generated.

A specific description is now given utilizing the example shown in FIG. 4.

Here, just vehicle B of the vehicles A, B, C, D and E on the non-detection side is a large-type vehicle and the other vehicles A, C, D and E are small vehicles.

ID code signals a, b, c, d and e generated by the five vehicles A, B, C, D and E are shown in FIG. 10.

A sub-pulse added after a main pulse is a classification code for separating the types of moving body, with the ID code signal b for the vehicle B indicating a type code for a large vehicle and the ID code signals a, c, d and e for the other vehicles A, C, D and E indicating type codes for small vehicles.

The ID codes for the similar vehicles A, C, D and E are therefore given priorities in this order.

Looking from the point of view of communication control of the vehicle E, as the vehicle C and the vehicle D are determined to be the same type of neighboring upper order vehicles, the flag F=1 and a response signal is not transmitted.

The same can also be said of vehicle D.

As the ID code of the vehicle C itself is the ID code of the highest order of the vehicles C and D constituting the neighboring group of vehicles of the same type the flags F=0, G=1 and H=1 and if a detection signal is received, a same type group response signal is transmitted (step 47).

As the vehicle B differs in type from the other vehicles A, C, D and E, flag F=0, F=1 and H=0 and if a detection signal is received, a different type group response signal is transmitted (step 46).

As the vehicle A is separated from the group, the flag F=0, G=0 and if a detection signal is received, an independent response signal is transmitted (step 45).

Figure 11:
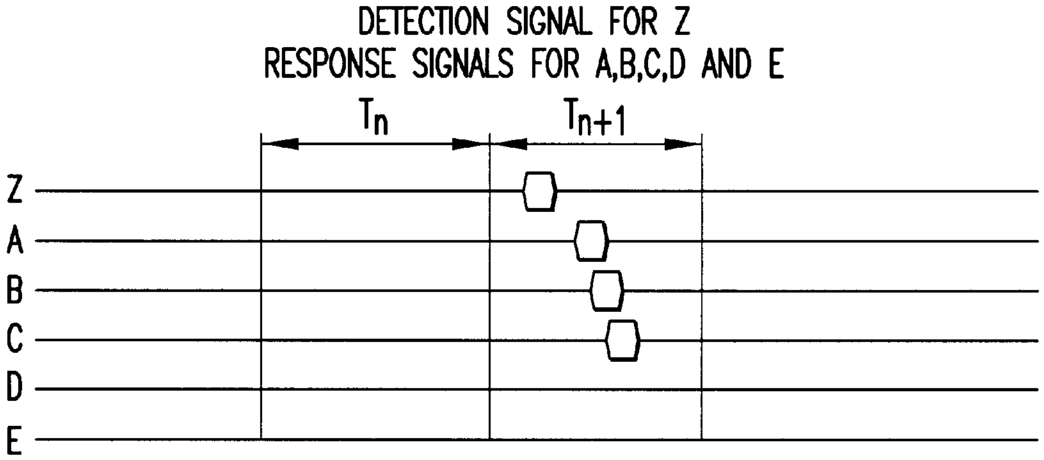
FIG. 11 is a view showing a detection signal for vehicle Z and response signals for vehicles A, B, C, D and E occurring in the same embodiment.

Therefore, when a detection signal is transmitted from the vehicle Z, as shown in FIG. 11, there are response signals from the vehicles A, B and C and no response signals from the vehicles D and E.

However, an independent response signal from the vehicle A, a different type group response signal from the vehicle B and a same type group response signal from the vehicle C are transmitted.

A same type group response signal is a response signal with a signal indicating the presence of other moving bodies of the same type within a prescribed distance about the moving body itself added. A different type group response signal is a response signal with a signal indicating that other moving bodies of a different type are present within a prescribed distance of the body itself added.

The vehicles B C, D and E comprising this group are further classified into vehicle B and vehicle C, and vehicle D and vehicle E, a representative is selected from each type from the ID codes with, in addition to the vehicle B the vehicle C that is typical of the vehicles C, D and E generating a same type group response signal.

The detection side vehicle Z can therefore confirm the distance to and the presence of the vehicles A, B and C, can confirm that the vehicle A is travelling independently, that the vehicle B constitutes the group and is the same type of vehicle and that the vehicle C is within the group but is a different type of vehicle, and can also know the configuration of the group of opposing vehicles and the configuration of the main aspects of the vehicles within the group.

As only the vehicle C typical of the vehicles C, D and E of the same type transmits a same type group response signal and the other vehicles D and E do not, the response signals do not become mixed up and signal receiving can be carried out in a reliable manner.

Figure 12:
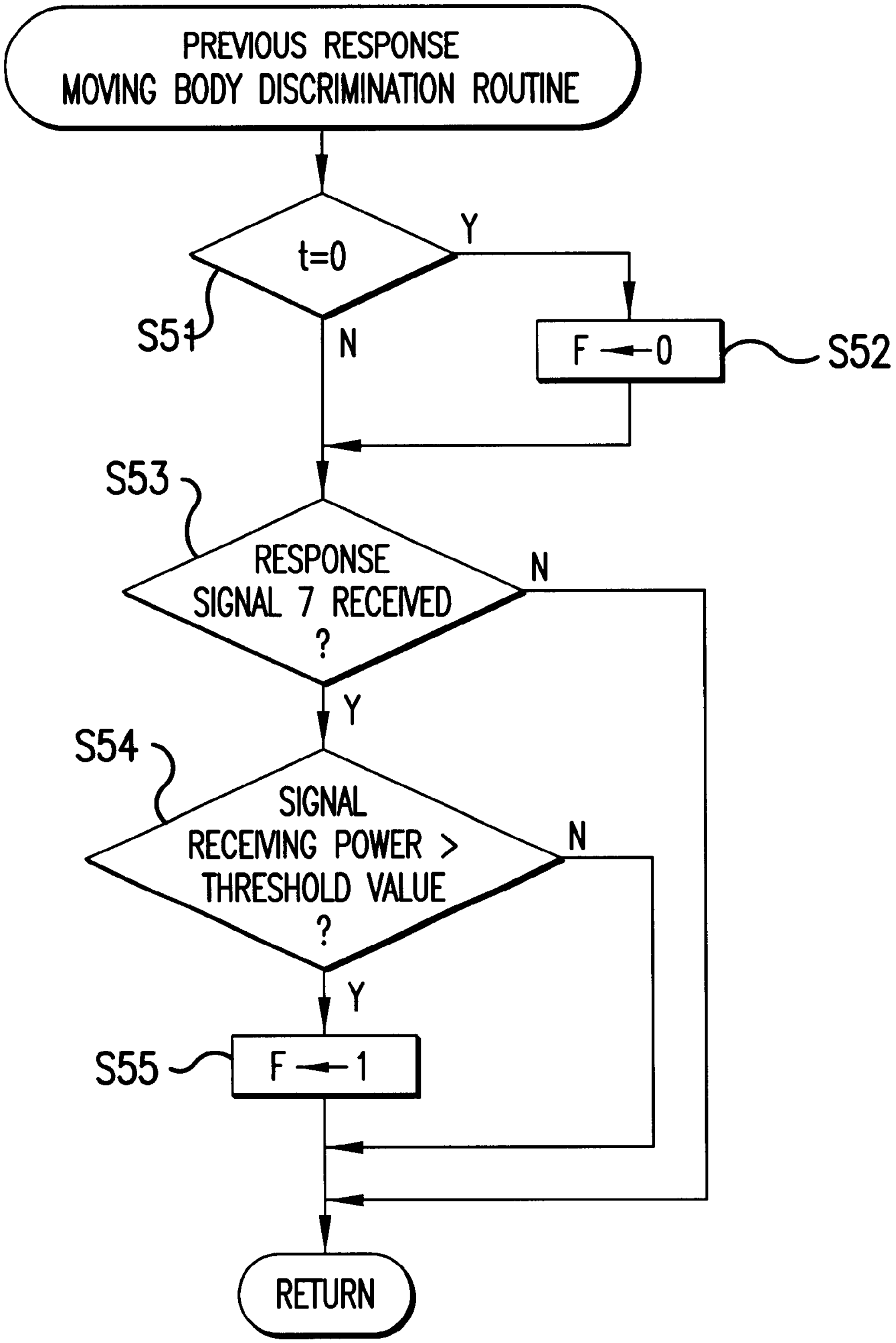
FIG. 12 is a flowchart showing a preceding response signal moving body discrimination routine for communication control in a still further embodiment.

Next, a description is given based on FIG. 12 of a further embodiment. The moving body detection system is the same as that shown in FIG. 1 but on this occasion an ID code signal is not transmitted.

Each moving body carries out communication control as shown in FIG. 12. A control procedure for determining the generation of a response signal prior to a non-detection side moving body generating a response signal when a response signal generated by a non-detection side moving body is received by another non-detection side moving body is shown in a flowchart of FIG. 12.

First, whether or not the same routine has been entered is determined in time t (step 51), step 52 is proceeded to at a start time of t=0, flag F is set to “0”, step 53 is proceeded to and thereafter step 51 is oceeded to directly from step 51 until a fixed time is exceeded.

Therefore, whether or not a response signal has been received is etermined when step 53 is proceeded to initially with F=0.

If a response signal is not received, this routine is exited with F=0 nd the process is repeated from step 51.

If a response signal is received, step 54 is proceeded to and a determination is made as to whether or not the signal receiving power of the response signal is in excess of a prescribed threshold value.

When the signal receiving power is smaller than the threshold value and a moving body is therefore further away than the prescribed distance, the routine is exited with F=0 and the process is repeated from step 1.

When a moving body is within the prescribed distance, step 55 is proceeded to, the flag F is put to “1” and this routine is exited. Therefore, when another non-detection side moving body within the prescribed distance has previously transmitted a response signal, the flag F is put to “1”.

This response signal transmission control is the same as that shown in the flowchart of FIG. 3 for the aforementioned embodiment with the exception of the judgement of step 13 onwards (and this is therefore omitted from the flowchart). Namely, if F=1, i.e., when there has been a preceding response signal, a response signal is not transmitted even if a detection signal is received and when F=0, i.e. when there is no preceding response signal, a response signal is transmitted if a detection signal is received.

When a plurality of moving bodies move in a group in this way and a moving body within this group generates a response signal beforehand, another moving body within the group therefore does not generate a response signal even if a detection signal is received.

Namely, the moving body that is representative of the group and which generates a response signal is the moving body that previously generated a response signal.

By transmitting a response signal for a representative moving body that has transmitted a response signal beforehand with respect to a detection signal for each group, the main parts of the configuration of opposing moving bodies can be known at the detection side moving body that receives this signal.

Signals can then be received in a reliable manner without response signals becoming mixed up because a response signal is transmitted only for a moving body that is representative within the group and a response signal is not transmitted by other moving bodies.

Further, if signals are exchanged between moving bodies already comprising a group, whether or not each moving body is a member of a group can be recognized. Therefore, a signal identifying whether a moving body that has previously transmitted a response signal is independent or comprises a group can be added to this response signal and whether or not this moving body is independent or belongs to a group can be discerned by a detection side moving body from the same response signal.

If an ID code is added to communication signals going between the aforementioned moving bodies, whether or not of each moving body is the same when moving bodies comprise a group can be ascertained. A signal identifying whether a moving body transmitting a response signal beforehand is independent or part of a group, or of the same or a different type within a group, can be added to this response signal. It can then be determined at a detection side moving body whether a moving body is independent or within a group and whether this moving body is of the same type or of different type to other bodies within the group from the same response signal.

In the above case, control is exerted in such a manner that a response signal is transmitted if a response signal for a different type moving body is received even if a response signal is received beforehand for a moving body within a group and a response signal is not transmitted if the type is the same.

The configuration of an opposing group of moving bodies and the configuration of the main aspects of the moving bodies within the group can therefore be known at a detection side moving body. Further, an example is shown of using signal receiving power as a method of determining distance but distance can of course also be measured using types of radar and other methods.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A moving body detection method for transmitting and receiving signals in such a manner that moving bodies can detect each other comprising:

identifying a type of moving body to which a body belongs;

transmitting an ID code for identifying a moving body and giving the moving body a priority with respect to each type as an ID code of a fixed period;

receiving ID code signals for each moving body from other moving bodies;

determining an ID code received from a moving body to determine if a neighboring upper order moving boy belongs to the same type;

determining if an ID code of a higher order than a moving body is present or not within a prescribed distance;

determining the presence of a moving body of a same type neighboring upper order moving body; and transmitting a response signal only when a same type neighboring upper order moving body is determined not to be present when a detection signal transmitted from a detection side moving body is received.

2. The moving body detection method for transmitting and receiving signals in such a manner that moving bodies can detect each other according to claim 1, wherein a second moving body receiving a detection signal transmitted by a first moving body transmits a response signal with respect to the detection signal except in the case where a response signal transmitted previously by a third moving body within a prescribed distance from the second moving body is received by the second moving body.

3. The moving body detection method according to claim 2, wherein a type code identifying the type of a moving body is included in the response signal, and the second moving body transmits a response signal with respect to the detection signal with the exception of the case where a response signal from the second moving body has already been received from a third moving body belonging to the same type as the second moving body.

4. The moving body detection method according to claim 3, wherein a moving body receiving the detection signal measures the distance to the moving body transmitting the response signal based on the received response signal.

5. A moving body detection method having a detection system for transmitting and receiving signals in such a manner that moving bodies can detect each other comprising:

transmitting an ID code for each moving body for identifying the moving body itself and giving a priority to the moving body as an ID code signal of a fixed time period;

receiving said ID code signals by each moving body from other moving bodies;

determining an ID code signal received by each moving body to determine if a neighboring upper order moving body of a higher order than itself is present within a prescribed distance;

determining the presence of a neighboring upper order moving body when receiving a detection signal transmitted from a detection side moving body; and transmitting a response signal only when the neighboring upper order moving body is determined not to be present.

6. A moving body detection system for transmitting and receiving signals in such a manner that moving bodies can detect each other comprising:

an ID code transmitted by each moving body for identifying itself and giving a priority to the moving body;

a transmission circuit for transmitting said ID codes to other moving bodies;

a receiving circuit for receiving said ID codes from other moving bodies;

a first detector for determining a distance to other moving bodies;

a second detector for determining an order of ID codes moving between bodies;

wherein each moving body transmits an ID code for identifying the moving body itself and giving a priority to the moving body as an ID code signal of a fixed time period, each moving body receives said ID code signals of other moving bodies, each moving body, upon receiving an ID code signal, makes a determination as to whether or not a neighboring upper order moving body of a higher order than itself is present within a prescribed distance, and each moving body, upon receiving a detection signal transmitted from a detection side moving body, determines the presence of a neighboring upper order moving body and transmits a response signal only when the neighboring upper order moving body is determined not to be present.

7. A moving body detection system for transmitting and receiving signals in such a manner that moving bodies can detect each other comprising:

an ID code transmitted by each moving body for identifying itself and giving a priority to the moving body;

a self-classification code identifying a vehicle type being placed on the ID code signal for each moving body;

a communications control circuit;

a transmission circuit for transmitting said ID codes to other moving bodies;

a receiving circuit for receiving said ID codes from other moving bodies;

a first detector for determining a distance to other moving bodies;

a second detector for determining an order of ID codes between moving bodies;

wherein each moving body is capable of identifying a type to which it itself belongs and transmits an ID code for identifying itself and giving itself a priority to each type as an ID code signal of a fixed time period, each moving body receives said ID code signals from other moving bodies, each moving body, upon receiving an ID code signal, makes a determination as to whether or not a neighboring upper order moving body belonging to a same type and of a higher order than itself is present within a prescribed distance, and said communications control circuit of each moving body, upon receiving a detection signal transmitted from a detection side moving body, determines the presence of a same type neighboring upper order moving body and transmits a response signal only when a same type neighboring upper order moving body is determined not to be present.

8. The moving body detection system for transmitting and receiving signals in such a manner that moving bodies can detect each other according to claim 7, wherein a second moving body receiving a detection signal transmitted by a first moving body transmits a response signal with respect to the detection signal except in the case where a response signal transmitted previously by a third moving body within a prescribed distance from the second moving body is received by the second moving body.

9. The moving body detection system according to claim 8, wherein a type code identifying the type of a moving body is included in the response signal, and the second moving body transmits a response signal with respect to the detection signal with the exception of the case where a response signal from the second moving body has already been received from a third moving body belonging to the same type as the second moving body.

10. The moving body detection system according to claim 9, wherein a moving body receiving the detection signal measures the distance to the moving body transmitting the response signal based on the received response signal.

* * * * *